United States Patent
Kim et al.

(10) Patent No.: US 10,879,562 B2
(45) Date of Patent: Dec. 29, 2020

(54) SOLID ELECTROLYTE, PREPARATION METHOD THEREOF, AND ALL-SOLID-STATE BATTERY EMPLOYING THE SAME

(71) Applicant: Korea Electronics Technology Institute, Seongnam-si (KR)

(72) Inventors: Kyungsu Kim, Yongin-si (KR); Woosuk Cho, Seongnam-si (KR); Goojin Jeong, Seongnam-si (KR); Jisang Yu, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 16/767,725

(22) PCT Filed: Nov. 27, 2018

(86) PCT No.: PCT/KR2018/014720
§ 371 (c)(1),
(2) Date: May 28, 2020

(87) PCT Pub. No.: WO2019/107879
PCT Pub. Date: Jun. 6, 2019

(65) Prior Publication Data
US 2020/0381772 A1 Dec. 3, 2020

(30) Foreign Application Priority Data
Nov. 29, 2017 (KR) .................. 10-2017-0161731

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC .......... H01M 10/052; H01M 10/0562; H01M 2220/20; H01M 2300/008; H01M 2300/0068
See application file for complete search history.

(56) References Cited

FOREIGN PATENT DOCUMENTS

| KR | 10-2007-0000983 A | 1/2007 |
|---|---|---|
| KR | 10-2014-0103957 A | 8/2014 |
| KR | 10-2016-0010492 A | 1/2016 |
| KR | 10-2016-0103925 A | 9/2016 |
| WO | WO 2016/004702 A1 | 1/2016 |

OTHER PUBLICATIONS

International Search Report dated Mar. 11, 2019 in corresponding International Patent Application No. PCT/KR2018/014720 (2 pages in English, 2 pages in Korean).

*Primary Examiner* — Carlos Barcena
(74) *Attorney, Agent, or Firm* — NSIP Law

(57) ABSTRACT

The present disclosure provides a solid electrolyte including an oxysulfide-based compound represented by $Li_aP_bM_cS_dO_eX$ (Formula 1) and having excellent stability against moisture, a method of manufacturing the solid electrolyte, and an all-solid-state battery showing superior manufacturing processability. In Formula 1, M is one selected from a group consisting of Zr, Nb, Hf, Ta, Ga, In, Ti, Pb, Bi, Ge, As, Sb, Si, B, Al, and a combination thereof. X is one selected from a group consisting of F, Cl, Br, and I. Also, $6<a\leq7$, $0<b<1$, $0<c<1$, $4<d<5$, and $0<e<1$.

17 Claims, 3 Drawing Sheets

SOLID ELECTROLYTE, PREPARATION METHOD THEREOF, AND ALL-SOLID-STATE BATTERY EMPLOYING THE SAME

CROSS REFERENCE TO RELATED APPLICATIONS

This application is a U.S. National Stage Application of International Application No. PCT/KR2018/014720, filed on Nov. 27, 2018, which claims the benefit under 35 USC 119(a) and 365(b) of Korean Patent Application No. 10-2017-0161731, filed on Nov. 29, 2017 in the Korean Intellectual Property Office, the entire disclosure of which is incorporated herein by reference for all purposes.

TECHNICAL FIELD

The present disclosure relates to a solid electrolyte having excellent stability against moisture, a method of manufacturing the solid electrolyte, and an all-solid-state battery having superior manufacturing processability.

BACKGROUND

Lithium secondary batteries are widely being used as power sources for mobile electronic devices such as mobile phones. Also, the application fields of the lithium secondary batteries are expanding according to an increased demand for large devices such as electric vehicles.

The lithium secondary battery, which employs a liquid electrolyte in which a lithium salt is dissolved in an organic solvent, poses a potential danger of a leakage of the electrolyte as well as an ignition and explosion of the battery due to an electrolyte decomposition reaction. The explosion of the product employing the battery actually occurs frequently, and it is urgent to resolve the problem.

An all-solid-state battery in which the liquid electrolyte is replaced with a solid electrolyte is advantageous in terms of safety since all battery components including electrodes and the electrolyte are solid. In addition, since a lithium metal or a lithium alloy can be used for a negative electrode material, the all-solid-state battery is advantageous in terms of battery performances such as energy density, output power, and product life and thus is under lots of study in recent years.

It is important to develop a solid electrolyte having a high lithium ion conductivity in order to enable the all-solid-state battery to exhibit its performance well. At present time when this application is being submitted, sulfide-based compounds such as $Li_{10}GeP_2S_{12}$, $Li_6PS_5Cl$, and $Li_2S$—$P_2S_5$ are widely being used as the solid electrolyte.

However, in the sulfide-based compound, a cross-linking sulfur of $P_2S_7^{4-}$, which may be included in the compound depending on a structure of the solid electrolyte, may react with moisture and oxygen in the air, or source materials such as $Li_2S$ remaining in the compound due to a low synthesis temperature may react with the moisture. Thus, the sulfide-based compound may reveal a low quality for storage and is difficult to handle. Specifically, the sulfide-based compound has problems in safety and stability because the compound may react with moisture as shown in a following reaction formula to generate a toxic gas such as hydrogen sulfide ($H_2S$).

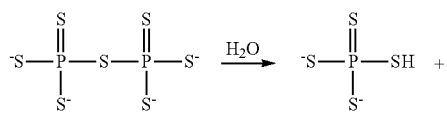

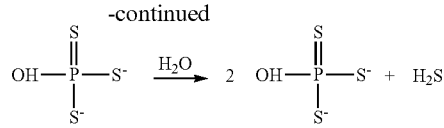

This problem leads to a decrease in the ionic conductivity of the solid electrolyte. Accordingly, an internal resistance of the all-solid-state battery using the sulfide-based compound as the solid electrolyte may increase as charging and discharging operations progress, and thus charging and discharging characteristics of the battery may be worsened significantly.

In order to solve the problem, the sulfide-based compound is typically handled in a sealed environment such as an argon atmosphere glove box and a moisture-controlled dry room, which, however, may hinder an enlargement of the all-solid-state battery product and degrade a productivity of a mass production manufacturing process.

Therefore, there is a high need for a solid electrolyte having high lithium ion conductivity and excellent stability against moisture, and a large area all-solid-state battery including the solid electrolyte and having enhanced manufacturing processability.

SUMMARY

One object of the present disclosure is to solve the problems of the prior art described above and the technical problems requested from the past.

Provided is a solid electrolyte including an oxysulfide-based compound and having a high stability against moisture and lithium ion conductivity.

Provided is a method of manufacturing the solid electrolyte with an optimized synthesis process.

Provided is an all-solid-state battery employing the solid electrolyte and having superior manufacturing processability.

Technical Solution

According to an aspect of an exemplary embodiment, the present disclosure provides solid electrolyte comprising an oxysulfide-based compound represented by $$Li_aP_bM_cS_dO_eX \quad \text{(Formula 1)}.$$

In Formula 1, M is one selected from a group consisting of Zr, Nb, Hf, Ta, Ga, In, Ti, Pb, Bi, Ge, As, Sb, Si, B, Al, and a combination thereof, X is one selected from a group consisting of F, Cl, Br, and I, and $6<a\leq7$, $0<b<1$, $0<c<1$, $4<d<5$, and $0<e<1$.

The element M may be Si, Al, B, Ge, or a combination thereof. More specifically, the element M may be Si.

The element X may be Cl or Br.

a, b, c, and d may satisfy respective conditions of: $6<a\leq6.5$, $0.5\leq b<1$, $0<c\leq0.5$, $4.5\leq d<5$, and $0<e\leq0.5$. More specifically, a, b, c, and d may satisfy respective conditions of: $6<a\leq6.3$, $0.7\leq b\leq0.9$, $0.1\leq c\leq0.3$, $4.6\leq d\leq4.8$, and $0.2\leq e\leq0.4$.

b and c may satisfy a relationship $b+c=1$, and d and e may satisfy a relationship $d+e=1$.

The oxysulfide-based compound may include a crystal phase of an argyrodite-type crystal structure.

An ionic conductivity of the solid electrolyte may range from $0.1\times10^{-3}$ S/cm to $10\times10^{-3}$ S/cm at room temperature (25° C.).

The oxysulfide-based compound may be $Li_{6.15}P_{0.85}Si_{0.15}S_{4.7}O_{0.3}Cl$.

According to an aspect of another exemplary embodiment, the present disclosure provides a method of manufacturing the solid electrolyte of Formula 1.

The method includes:

(a) mixing lithium sulfide, $P_2S_5$, oxide of a metal M, and LiX (where, M is one or more selected from a group consisting of Zr, Nb, Hf, Ta, Ga, In, Ti, Pb, Bi, Ge, As, Sb, Si, B, and Al, and X is F, Cl, Br, and I);

(b) compressing a compound mixed in operation (a) to prepare pellets;

(c) heat-treating the pellets prepared in operation (b) in a vacuum atmosphere; and (d) cooling and grinding the pellets heat-treated in operation (c).

The mixing in the operation (a) may include: milling at 200 rpm to 600 rpm for 1 hour to 3 hours.

A degree of vacuum of the vacuum atmosphere in the operation (c) may be less than 0.1 mmHg.

The heat-treating in the operation (c) may be performed at a temperature ranging from 400° C. to 700° C. for 5 hours to 7 hours.

The operations (a) through (d) may be performed in a condition of not being exposed to moisture and oxygen.

According to an aspect of yet another exemplary embodiment, the present disclosure provides an all-solid-state battery including the solid electrolyte.

The solid electrolyte according to the present disclosure includes an oxysulfide-based compound and has a high stability against moisture, so that an amount of hydrogen sulfide generated when the compound reacts with moisture in the air is minimized. Thus, it is possible to secure a lithium ion conductivity at a level of a conventional sulfide-based compound while retarding a rate of a hydrogen sulfide generation.

In addition, the present disclosure enables to optimize a synthesis process of the oxysulfide-based compound by controlling the source materials of the oxysulfide-based compound.

The all-solid-state battery employing the solid electrolyte may be mass-produced to have a large area, and thus may realize a superior manufacturing processability.

BRIEF DESCRIPTION OF THE DRAWINGS

In order that the disclosure may be well understood, there will now be described various forms thereof, given by way of example, reference being made to the accompanying drawings, in which.

Figure 1:
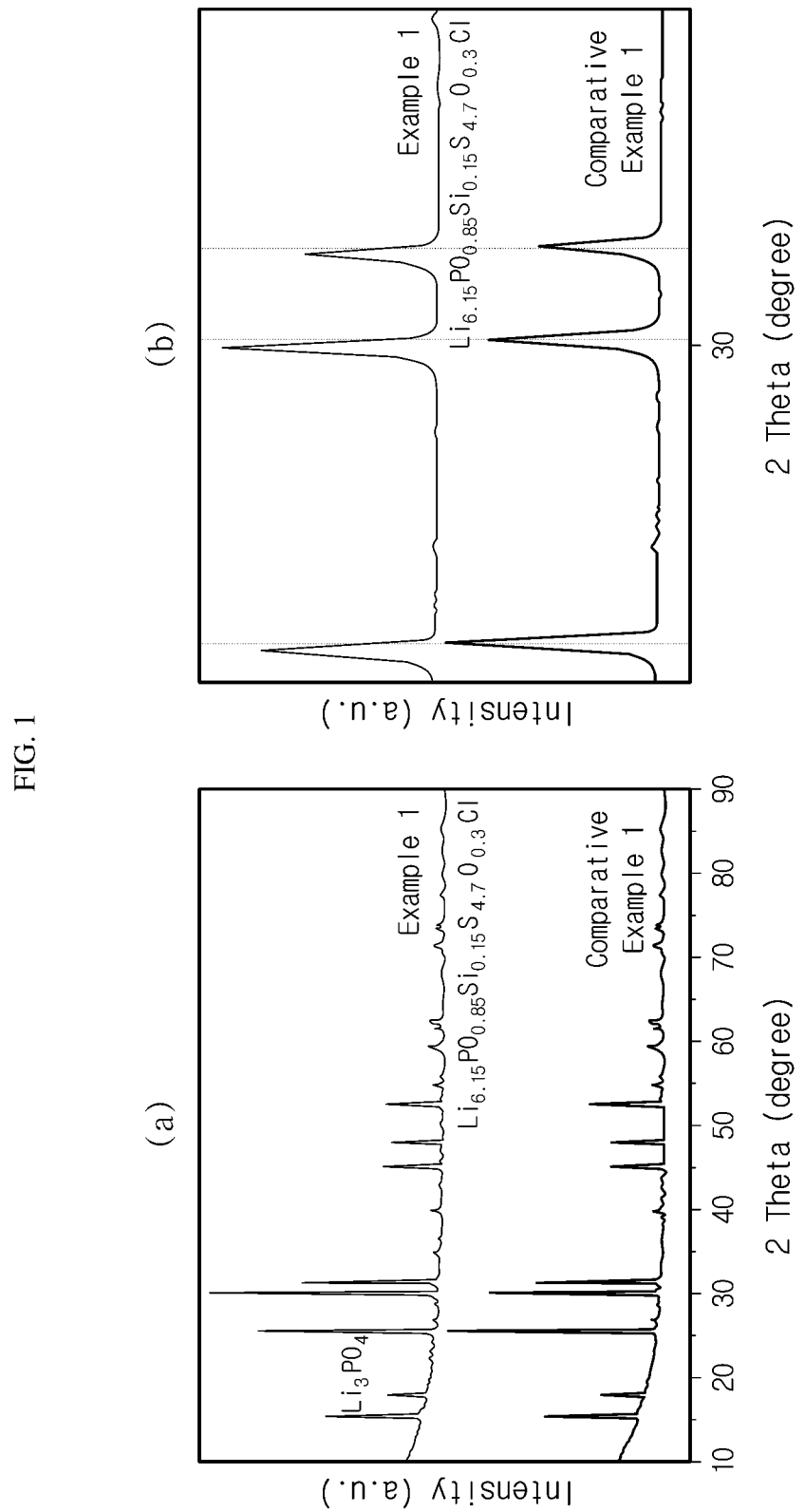
FIG. 1 is a graph illustrating results of X-ray diffraction analyses for compounds prepared according to Example 1 and Comparative Example 1.

The drawings described herein are for illustration purposes only and are not intended to limit the scope of the present disclosure in any way.

DETAILED DESCRIPTION

Solid Electrolyte

In general, the sulfide-based compounds such as $Li_{10}GeP_2S_{12}$, $Li_6PS_5Cl$, and $Li_2S$—$P_2S_5$ applicable to the solid electrolyte have problems in safety and stability, as described above, because the cross-linking sulfur of $P_2S_7^{4-}$ which may be included in the compound depending on the structure of the solid electrolyte or the source materials such as $Li_2S$ remaining in the compound as impurities after a synthesis process may react with moisture to generate a toxic hydrogen sulfide gas.

The solid electrolyte according to the present disclosure includes an oxysulfide-based compound in which a part of sulfur atoms is replaced with oxygen, and has an enhanced stability against moisture while maintaining a high lithium ion conductivity. Thus, the solid electrolyte according to the present disclosure may minimize a hydrogen sulfide generation rate and an amount of the hydrogen sulfide generated.

The oxysulfide-based compound can be represented by Formula 1.

$$Li_aP_bM_cS_dO_eX \qquad \text{(Formula 1)}$$

In Formula 1, M is one selected from a group consisting of Zr, Nb, Hf, Ta, Ga, In, Ti, Pb, Bi, Ge, As, Sb, Si, B, Al, and a combination thereof; X is one selected from a group consisting of F, Cl, Br, and I; and $6<a\le7$, $0<b<1$, $0<c<1$, $4<d<5$, and $0<e<1$.

In detail, the oxysulfide-based compound has a form in which some elements are substituted with elements M and oxygen (O), and a substituent element causes a change in crystal lattice constants of the compound, which is a factor that improves the stability against moisture.

Specifically, the element M may be Si, Al, B, Ge, or a combination thereof. More specifically, the element M may be Si.

Specifically, X may be Cl or Br. More specifically, X may be Cl.

A lithium content 'a' in Formula 1 is intended to secure sufficient lithium ion conductivity by maintaining an appropriate crystal structure. The lithium content 'a' of 6 or less or greater than 7 is not preferable because it may not be possible to ensure the sufficient lithium ion conductivity.

In case that a phosphor content 'b' in Formula 1 is 1 or greater, or a content 'c' of the element M is 1 or greater, the phosphor or the element M may act as an impurity and drastically lower the ionic conductivity. Also, in case that a sulfur content 'd' is 4 or less or 5 or greater, the lithium ion conductivity may be deteriorated. In case that an oxygen content 'e' is 1 or greater, a change in an inter-planar distance caused by an introduction of oxygen in the crystal structure may be excessively large and the crystal structure may become unstable, which is not desirable.

Thus, specifically, the lithium content 'a', the phosphor content 'b', the content 'c' of the element M, the sulfur content 'd', and the oxygen content 'e' may be determined such that $6<a\le6.5$, $0.5\le b<1$, $0<c\le0.5$, $4.5\le d<5$, and $0<e\le0.5$, respectively. More specifically, the contents may be determined such that $6<a\le6.3$, $0.7\le b\le0.9$, $0.1\le c\le0.3$, $4.6\le d\le4.8$, and $0.2\le e\le0.4$.

The oxysulfide-based compound may have a form in which the element M is substituted into a site of a phosphor (P) and the oxygen (O) is substituted into a site of the sulfur (S), Here, the phosphor content 'b' and the content 'c' of the element M may satisfy a relationship b+c=1, the sulfur content 'd' and the oxygen content 'e' may satisfy a relationship d+e=1.

The oxysulfide-based compound may be amorphous or crystalline according to preparation conditions described below, or have a mixed structure thereof. In particular, the oxysulfide-based compound may include a crystal phase of an argyrodite-type crystal structure.

Since the argyrodite-type crystal structure is well known in the art, detailed descriptions thereof will be omitted for simplicity. This argyrodite-type crystal structure allows the oxysulfide-based compound to have a high ionic conductivity.

In detail, the ionic conductivity of the solid electrolyte including the oxysulfide-based compound may range from $0.1 \times 10^{-3}$ S/cm to $10 \times 10^{-3}$ S/cm at room temperature (for example, at 25° C.) and, more specifically, from $0.5 \times 10^{-3}$ S/cm to $5 \times 10^{-3}$ S/cm. In view of the fact that the ionic conductivity required for the practical use of the solid electrolyte for the all-solid-state battery is generally about $10^{-4}$ S/cm to $10^{-3}$ S/cm at room temperature, it can be seen that the solid electrolyte according to the present disclosure has sufficient lithium ion conductivity.

The oxysulfide-based compound may be represented by $Li_{6.15}P_{0.85}Si_{0.15}S_{4.7}O_{0.3}Cl$, which has a form in which silicon (Si) and oxygen (O) are substituted into a known solid electrolyte material $Li_6PS_5Cl$. The oxysulfide-based compound maintains the argyrodite-type crystal structure similarly to $Li_6PS_5Cl$, and has superior stability against moisture to suppress the reaction with moisture while exhibiting high lithium ion conductivity.

Meanwhile, the solid electrolyte according to the present disclosure may further include a conventional solid electrolyte commonly used in the all-solid-state battery in addition to the oxysulfide-based compound. For example, the solid electrolyte according to the present disclosure may contain an inorganic solid electrolyte or an organic solid electrolyte as the conventional solid electrolyte.

The inorganic solid electrolyte may be a crystalline or amorphous ceramic-based material. Examples of the inorganic solid electrolyte may include ThioLISICON $(Li_{3.25}Ge_{0.25}P_{0.75}S_4)$, $Li_2S$—$SiS_2$, LiI—$Li_2S$—$SiS_2$, LiI—$Li_2S$—$P_2S_5$, LiI—$Li_2S$—$P_2O_5$, LiI-$Li_3PO_4$-$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (where, w<1), $Li_{3.6}Si_{0.6}P_{0.4}O_4$, or a combination thereof.

The organic solid electrolyte may be a mixture of a lithium salt with a polymer-based material such as polyethylene derivatives, polyethylene oxide derivatives, polypropylene oxide derivatives, phosphate ester polymers, poly-I-lysine, polyester sulfide, polyvinyl alcohol, polyvinylidene fluoride, for example. At this time, two or more organic solid electrolytes may be used in a combination as well.

The inorganic solid electrolyte or the organic solid electrolyte may be added in an amount of 0.01 wt % to 30 wt % of the entire solid electrolyte. More specifically, the inorganic solid electrolyte or the organic solid electrolyte may be added in an amount of 0.1 wt % to 20 wt %.

The thickness of a solid electrolyte layer, which may vary depending on a structure of the all-solid-state battery. For example, the thickness of the solid electrolyte layer may range from 1 micrometer to 100 micrometers and, more specifically, from 0.1 micrometer to 1 micrometer.

Manufacturing Method of Solid Electrolyte

The present disclosure provides a method of manufacturing the solid electrolyte including the compound represented by Formula 1, including operations of:

(a) mixing lithium sulfide, $P_2S_5$, oxide of a metal M, and LiX (where, M is one or more selected from a group consisting of Zr, Nb, Hf, Ta, Ga, In, Ti, Pb, Bi, Ge, As, Sb, Si, B, and Al, and X is F, Cl, Br, and I);

(b) compressing a compound mixed in operation (a) to prepare pellets (c) heat-treating the pellets prepared in operation (b) in a vacuum atmosphere; and (d) cooling and grinding the pellets heat-treated in operation (c).

In other words, after preparing an amorphized material by mixing source compositions including the constituents of the compound of Formula 1 such as lithium sulfide, the solid electrolyte according to the present disclosure may be obtained by heating the amorphized material to enhance the crystallinity thereof.

Such a synthesis process is performed in a glove box or a dry room that prevents the materials from being exposed to moisture and oxygen so as to suppress a formation reaction of by-products such as $L_2S$ and increase the stability against moisture.

The lithium sulfide is not limited to a particular material in the present disclosure, and a known material may be selected and used as well. Typically, the lithium sulfide may be $Li_2S$, $Li_2S_2$, or the like. More specifically, the lithium sulfide may be $Li_2S$.

The oxide of the metal M may be selected according to the type of the metal M described above, Specifically, the oxide of the metal M may be $SiO_2$.

At this time, the content ratio of lithium sulfide, $P_2S_5$, the oxide of the metal M, and LiX to be mixed can be adjusted variously according to molar ratio of a final oxysulfide-based compound.

The mixing may be a dry mixing or a wet mixing, and the present disclosure is not particularly limited to any of the methods. However, the dry mixing is preferred because the wet mixing takes more than one day to dry, which increases a process time and may cause side reactions due to a solvent.

Any dry mixing method having been used in the manufacture of a conventional mixed powder may be used in the present disclosure. For example, a mechanical milling may be performed for a uniform mixing of the constituent materials. The mechanical milling involves grinding a large pieces of materials while imparting mechanical energy to the pieces of materials to result in plastic deformation. Among various types of mechanical milling such as a roller mill, a ball milling, a mechano-fusion, and a jet milling, a ball milling which uses high impact energy efficiently can be used in the present disclosure.

Conditions for the mechanical milling can be adjusted appropriately according to an equipment being used. The faster a rotational speed, the faster a production rate of the compound. The slower the rotation speed, the higher a conversion rate of the source materials composition to the compound. For example, in case of using a general ball mill, the mixing of the operation (a) may be performed at 200 rpm to 600 rpm for 1 hour to 3 hours. More specifically, the mixing operation may be performed at 200 rpm to 400 rpm for 1.5 hour to 2.5 hours.

The pellet described with regard to the operation (b) is a high-density lump produced by compressing the compound, and there is no limitation in its form. Since the pellets contain a number of amorphous or polycrystalline domains of the oxysulfide-based compound, the operations of the heat treatment and cooling are required.

The heat treatment of the operation (c) may be performed in a vacuum atmosphere to prevent oxidation of the materials. For example, a degree of vacuum may be less than 0.1 mmHg. More specifically, the degree of vacuum may be less than 0.04 mmHg.

The heat treatment may be performed under a condition of maintaining a temperature in a range from 400° C. to 700° C. for 5 hours to 7 hours, for example. In case that the heat treatment is performed at a temperature below 400° C., it is possible that some materials such as $Li_2S$ which may react later with the moisture to generate the hydrogen sulfide may remain in the compound due to the low temperature. In case that the heat treatment is performed at a temperature above 700° C., the particles of the oxysulfide-based compound may become too large and have non-uniform sizes, and thus the ion conductivity may be deteriorated, which is undesirable. More specifically, the heat treatment may be performed at 450° C. to 650° C. for 5.5 hours to 6.5 hours.

The heat treatment may be performed one or more times. Depending on circumstances, a first and second heat treatment may be performed over two stages.

The heat-treated compound may be grinded after a natural cooling to yield a crystalline oxysulfide-based compound.

The oxysulfide-based compound can be prepared in particles having an average size ranging from several nanometers to thousands of micrometers and being not limited to a particular shape. In case that the oxysulfide-based compound has a nano-scale particle size, a contact area with an electrode active material is increased so that lithium ion transfer paths are expanded, which is advantageous for charging and discharging of the battery. Specifically, the average particle size of the oxysulfide-based compound may be in the range of 0.001 micrometer to 50 micrometers.

All-Solid-State Battery

The present disclosure provides an all-solid-state battery including the solid electrolyte.

As mentioned above, the solid electrolyte according to the present disclosure which includes the oxysulfide-based compound exhibits a high lithium ion conductivity while minimizing the hydrogen sulfide generation rate and the amount of the hydrogen sulfide generated when exposed to the air. Therefore, the all-solid-state battery employing the solid electrolyte exhibits excellent stability against moisture in addition to safety, and thus may be mass-produced to have a large area and may realize show a superior manufacturing processability.

The all-solid-state battery includes a positive electrode, a negative electrode, and the solid electrolyte interposed between the positive electrode and the negative electrode.

Hereinbelow, each component of the all-solid-state battery of the present disclosure will be described in detail.

The positive electrode has a configuration in which a positive electrode mixture containing a positive electrode active material is applied to a current collector. The positive electrode mixture may further include a binder and a conductive agent, if necessary.

The positive electrode active material may be a lithium metal oxide such as $LiNi_{0.8-x}Co_{0.2}Al_xO_2$, $LiCo_xMn_yO_2$, $LiNi_xCo_yO_2$, $LiNi_xMn_yO_2$, $LiNi_xCoyMnzO_2$, $LiCoO_2$, $LiNiO_2$, $LiMnO_2$, $LiFePO_4$, $LiCoPO_4$, $LiMnPO_4$ and $Li_4Ti_5O_0$ (where, 0<x<1 and 0<y<1); a chalcogenide such as $Cu_2Mo_6S_8$, FeS, CoS and MiS; or an oxides, sulfide, or a halide of scandium, ruthenium, titanium, vanadium, molybdenum, chromium, manganese, iron, cobalt, nickel, copper, or zinc, for example. More specifically, $LiNi_{0.8}Co_{0.1}Mn_{0.1}O_2$, $TiS_2$, $ZrS_2$, $RuO_2$, $Co_3O_4$, $Mo_6S_8$, or $V_2O_5$ may be used for the positive electrode active material, but the present disclosure is not limited thereto.

The shape of the positive electrode active material is not particularly limited, and may have a form of particles of spherical, elliptical, or rectangular parallelepiped shape, for example. The average particle size of the positive electrode active material may be in the range of 1 micrometer to 50 micrometers, but is not limited thereto. The average particle size of the positive electrode active material can be checked, for example, by measuring the sizes of the active material particles observed by a scanning electron microscope and calculating an average of measured values.

The binder is not particularly limited, and a fluorine-containing binder such as polyvinylidene fluoride (PVDF) or polytetrafluoroethylene (PTFE), for example, may be used for the binder. However, the present disclosure is not limited thereto.

The content of the binder is not limited to a particular value as long as it can fix the positive electrode active material to the current collector. The content of the binder may be in a range of 0 wt % to 10 wt % of the entire positive electrode mixture.

The conductive agent is not limited to a particular material as long as it can enhance a conductivity of the positive electrode. Examples of the conductive agent include nickel powder, cobalt oxide, titanium oxide, and carbon. The carbon may be any one selected from a group consisting of Ketjen black, acetylene black, furnace black, graphite, carbon fiber, and fullerene, and a combination thereof.

The content of the conductive agent may be chosen in consideration of conditions of the battery such as the type of the conductive agent. For example, the content of the conductive agent may be in a range of 1 wt % to 10 wt % of the entire positive electrode.

The positive electrode mixture may include the oxysulfide-based solid electrolyte according to the present disclosure by 0.1 wt % to 60 wt % of the entire positive electrode mixture, if necessary, to increase the lithium ion conductivity. More specifically, the positive electrode mixture may include the oxysulfide-based solid electrolyte by 10 wt % to 50 wt %.

The thickness of the positive electrode material mixture layer may be, for example, 0.1 micrometer to 1,000 micrometers.

The positive electrode current collector is not limited to a particular material as long as it has a high conductivity and does not cause a chemical change in the battery. The positive electrode current collector may be made of, for example, stainless steel, aluminum, nickel, titanium, or baked carbon; or aluminum or stainless steel surface-treated with carbon, nickel, titanium, or silver. Also, the positive electrode current collector may have any of various forms such as a film, sheet, or foil having fine irregularities formed on the surface thereof, a net; a porous body; a foam, and a non-woven fabric.

The negative electrode of the all-solid-state battery may be implemented by a lithium metal or a lithium alloy used alone, or a structure in which a negative electrode mixture containing a negative electrode active material is applied to a negative electrode current collector. The negative electrode mixture may further include a binder and a conductive agent, if necessary.

The negative electrode active material may include one or more selected from a group consisting of lithium metal, lithium alloy, lithium metal composite oxide, lithium-containing titanium composite oxide (LTO), and a combination thereof. The lithium alloy may be an alloy made of lithium and at least one of another metals selected from Na, K, Rb, Cs, In, Fr, Be, Mg, Ca, Sr, Ba, Ra, Al, and Sn. Also, the lithium metal composite oxide is an oxide (MeOx) of a combination (Me) of lithium and another metal selected from a group consisting of Si, Sn, Zn, Mg, Cd, Ce, Ni, and Fe. For example, the lithium metal composite oxide may be $Li_xFe_2O_3$ (where, $0<x\leq1$) or $Li_xWO_2$ (where, $0<x\leq1$). In addition, a metal composite oxide represented by SnxMe1-xMe'yOz (where, Me denotes Mn, Fe, Pb, or Ge; Me 'denotes Al, B, P, Si, Group 1, Group 2, Group 3 elements of the periodic table, halogen; $0<x\leq1$ Metal composite oxide, such as $1\leq y\leq3$; $1\leq z\leq8$) and another oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$ can be used for the negative electrode active material. Further, a carbon-based material such as crystalline carbon, amorphous carbon, carbon composite, and a combination thereof may be used for the negative electrode active material.

The negative electrode mixture may include the oxysulfide-based solid electrolyte according to the present disclosure by 0.1 wt % to 60 wt % of the entire negative electrode mixture, if necessary. More specifically, the negative electrode mixture may include the oxysulfide-based solid electrolyte by 10 wt % to 50 wt %.

The negative electrode current collector is not limited to a particular material as long as it has a high conductivity and does not cause a chemical change in the battery. The negative electrode current collector may be made of, for example, copper, stainless steel, aluminum, nickel, titanium, or baked carbon; aluminum or stainless steel surface-treated with carbon, nickel, titanium, or silver; or an aluminum-cadmium alloy. Also, the negative electrode current collector may have any of various forms such as a film, sheet, or foil having fine irregularities formed on the surface thereof, a net; a porous body; a foam, and a non-woven fabric.

The manufacture of the all-solid-state battery having the above-described configuration is not particularly limited to a process of the present disclosure, and the battery can be manufactured through a conventional process.

Specifically, after the solid electrolyte according to the present disclosure is disposed between the positive electrode and the negative electrode, the cell is assembled by a compression molding The solid electrolyte may be in a form of a solid electrolyte sheet. Alternatively, the solid electrolyte may be press-molded using the solid electrolyte alone or a mix with the binder, or may be prepared by dispersing in a solvent to form a slurry and then film-coating the slurry by use of a doctor blade or by a spin coating.

The assembled cell is sealed by heat compression after being installed in an exterior casing. Very suitable examples of the exterior casing include a laminate pack made of aluminum or stainless, and a cylindrical or rectangular cylindrical metal container.

Hereinbelow, the present disclosure will be described in more detail with reference to examples. However, the following examples are presented only for illustrating the present disclosure, and the scope of the present disclosure is not limited thereto.

Embodiment 1

The materials were synthesized to provide a composition below.

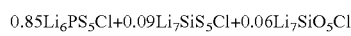

All experiments were performed in a glove box or a dry room which prevents the materials from being exposed to moisture and oxygen. Starting materials $Li_2S$ of 0.88185 gram (g), $P_2S_5$ of 0.70412 g, LiCl of 0.316 g, $SiO_2$ of 0.06718 g were weighed, respectively. The starting materials was placed in a milling container and mixed at 300 rpm for more than 2 hours to homogeneously mix the materials. After the mixture was recovered, it was compressed by a hydraulic press to form the pellets. The pellets were put into a quartz tube for the heat treatment and sealed in a vacuum atmosphere in which the degree of vacuum is less than 0.04 mmHg. After heating up to 550° C. at a heat-rise ratio of 2° C./minute, the temperature of the quartz tube was maintained for 6 hours and then cooled naturally. The pelletized sample having gone through the heat treatment was ground to synthesize $Li_{6.15}P_{0.85}Si_{0.15}S_{4.7}O_{0.3}Cl$ in powder form.

Comparative Example 1

After starting materials $Li_2S$, $P_2S_5$, and LiCl were weighed in a molar ratio and mixed in a mortar, the materials were mixed again homogeneously in a planetary mill for 6 hours. After the resulting mixture was made into pellets of which size is 15 millimeters, the pellets were heat-treated at 550° C. in a vacuum atmosphere to synthesize $Li_6PS_5Cl$.

Experimental Example 1

Results of X-ray diffraction analyses for the compounds manufactured according to Example 1 and Comparative Example 1 is illustrated in FIG. 1.

It can be seen, in (a) portion of FIG. 1, that the compound of Example 1 shows an argyrodite-type crystal structure as a whole compared with the compound of Comparative System 1. In addition, it can be seen, in (b) portion of FIG. 1, that a diffraction peak around 30 degrees shifted toward a low angle, which arose from the increase of the interplanar distance due to the introduction of oxygen.

Experimental Example 2

Figure 2:
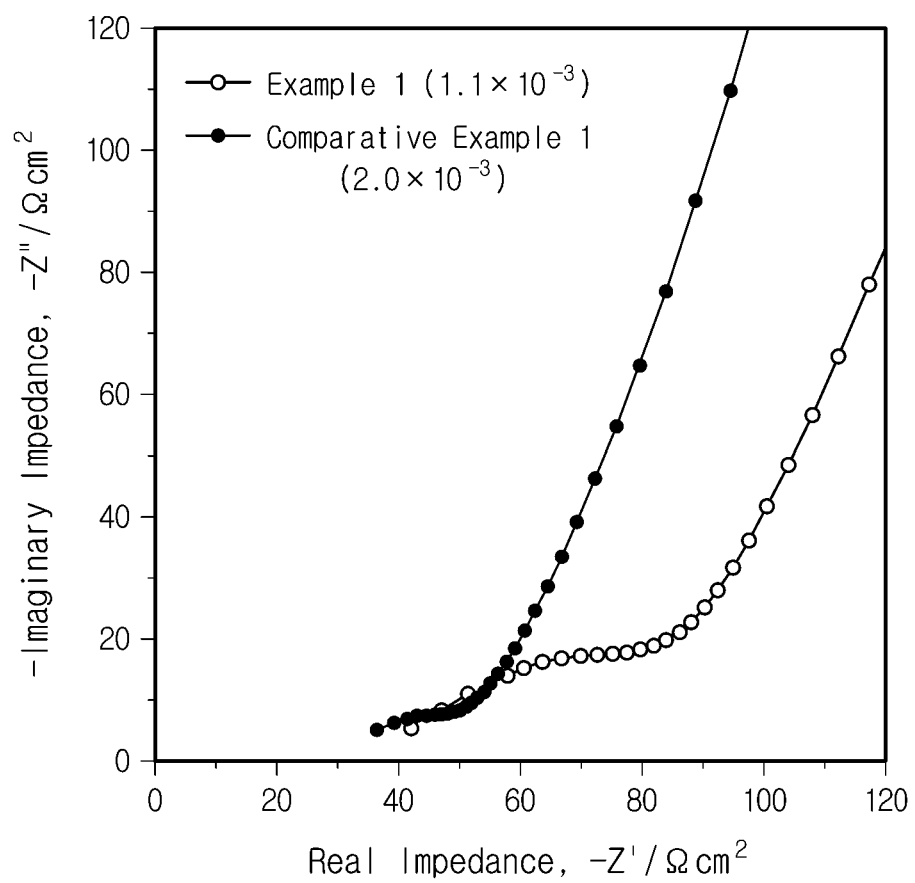
FIG. 2 is a graph illustrating AC impedances measured for the compounds prepared according to Example 1 and Comparative Example 1.

In order to check the difference in the lithium ion conductivity of the compounds obtained in Example 1 and Comparative Example 1, alternating current (AC) impedances were measured for the compounds prepared according to Example 1 and Comparative Example 1. FIG. 2 illustrates the AC impedances measured for the compounds.

Referring to FIG. 2, the lithium ion conductivity of the compound prepared according to Example 1 was $1.1\times10^{-3}$ S/cm, which was slightly lower than the lithium ion conductivity, $2.0\times10^{-3}$ S/cm of the compound prepared according to Comparative Example 1. However, the lithium ion conductivity for the compound prepared according to Example 1 is of the same order of magnitude ($1\times10^{-3}$ S/cm) as the component according to Comparative Example 1, and the decrease in the conductivity was a level that can be regarded as negligible in the art. Thus, it can be said that there would be little significant difference in the performance of the battery.

Experimental Example 3

The compounds obtained in Example 1 and Comparative Example 1 were compressed to prepare respective solid electrolytes having forms of the pellets. In order to check the stability against moisture of the solid electrolytes, amounts of hydrogen sulfide generated when being exposed to the air were measured. Each of the solid electrolytes according to Example 1 and Comparative Example 1 were weighed by 100 mg and placed in a separate sealed container along with a thermo-hygrometer and a hydrogen sulfide gas concentration meter. All of the above processes were performed in a dry room at a temperature below a dew point of −50° C. The two materials were simultaneously exposed to the air at room temperature (for example, at 25° C.) and a humidity of 30%. Then, the amount of hydrogen sulfide generated were monitored over time to check the reactivity with moisture. The results of periodic monitoring of the hydrogen sulfide generated over time is shown in FIG. 3.

Figure 3:
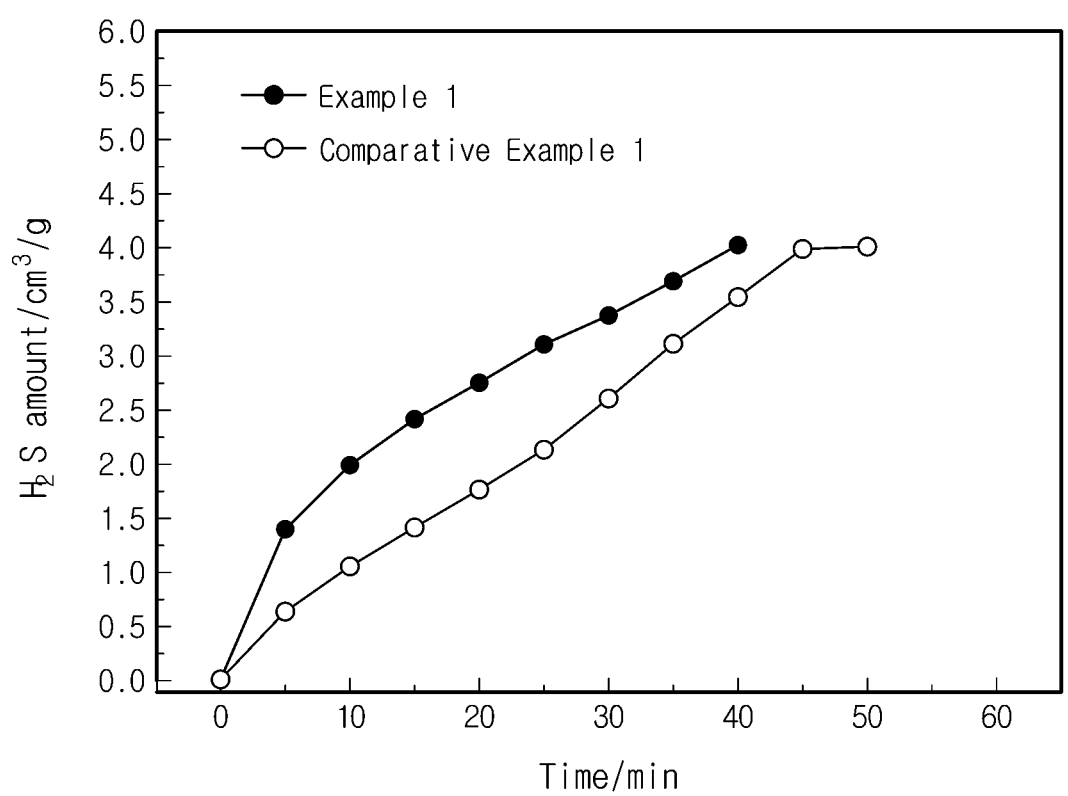
FIG. 3 is a graph illustrating amounts of hydrogen sulfide generated when the solid electrolytes prepared according to Example 1 and Comparative Example 1 were exposed to the air.

It can be seen, in FIG. 3, that compared to the solid electrolyte according to Comparative Example 1, the solid electrolyte according to Example 1 generates the hydrogen sulfide slowly and in a small amount.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A solid electrolyte comprising an oxysulfide-based compound represented by $$Li_aP_bM_cS_dO_eX \quad \text{(Formula 1)}$$

wherein M is one selected from a group consisting of Zr, Nb, Hf, Ta, Ga, In, Ti, Pb, Bi, Ge, As, Sb, Si, B, Al, and a combination thereof, wherein X is one selected from a group consisting of F, Cl, Br, and I, wherein $6<a\leq 7$, $0<b<1$, $0<c<1$, $4<d<5$, and $0<e<1$.

2. The solid electrolyte of claim 1, wherein M is Si, Al, B, Ge, or a combination thereof.

3. The solid electrolyte of claim 1, wherein M is Si.

4. The solid electrolyte of claim 1, wherein X is Cl or Br.

5. The solid electrolyte of claim 1, wherein $6<a\leq 6.5$, $0.5b<1$, $0<c\leq 0.5$, $4.5\leq d<5$, and $0<e\leq 0.5$.

6. The solid electrolyte of claim 1, wherein $6<a\leq 6.3$, $0.7\leq b\leq 0.9$, $0.1\leq c\leq 0.3$, $4.6\leq d\leq 4.8$, and $0.2\leq e\leq 0.4$.

7. The solid electrolyte of claim 1, wherein b and c satisfy a relationship b+c=1.

8. The solid electrolyte of claim 1, wherein d and e satisfy a relationship d+e=1.

9. The solid electrolyte of claim 1, wherein the oxysulfide-based compound comprises a crystal phase of an argyrodite-type crystal structure.

10. The solid electrolyte of claim 1, wherein an ionic conductivity of the solid electrolyte ranges from $0.1\times 10^{-3}$ S/cm to $10\times 10^{-3}$ S/cm at room temperature (25° C.).

11. The solid electrolyte of claim 1, wherein the oxysulfide-based compound is $Li_{6.15}P_{0.85}Si_{0.15}S_{4.7}O_{0.3}Cl$.

12. A method of manufacturing the solid electrolyte of Formula 1 according to claim 1, comprising:

(a) mixing lithium sulfide, $P_2S_5$, oxide of a metal M, and LiX (where, M is one or more selected from a group consisting of Zr, Nb, Hf, Ta, Ga, In, Ti, Pb, Bi, Ge, As, Sb, Si, B, and Al, and X is F, Cl, Br, and I);

(b) compressing a compound mixed in operation (a) to prepare pellets;

(c) heat-treating the pellets prepared in operation (b) in a vacuum atmosphere; and (d) cooling and grinding the pellets heat-treated in operation (c).

13. The method of claim 12, wherein the mixing in the operation (a) comprises:

milling at 200 rpm to 600 rpm for 1 hour to 3 hours.

14. The method of claim 12, wherein a degree of vacuum of the vacuum atmosphere in the operation (c) is less than 0.1 mmHg.

15. The method of claim 12, wherein the heat-treating in the operation (c) is performed at a temperature ranging from 400° C. to 700° C. for 5 hours to 7 hours.

16. The method of claim 12, wherein the operations (a) through (d) are performed in a condition of not being exposed to moisture and oxygen.

17. An all-solid-state battery comprising the solid electrolyte of claim 1.

* * * * *